United States Patent
Hoffer et al.

(10) Patent No.: US 9,387,537 B2
(45) Date of Patent: Jul. 12, 2016

(54) WEDGE CLAMP WITH FLUID PORT

(71) Applicant: Kennametal Inc., Latrobe, PA (US)

(72) Inventors: Brad Daniel Hoffer, White, PA (US); Michael Glenn Morrison, Tarrs, PA (US); Werner Bruno Penkert, Schwanstetten (DE)

(73) Assignee: KENNAMETAL INC., Latrobe, PA (US)

( * ) Notice: Subject to any disclaimer, the term of this patent is extended or adjusted under 35 U.S.C. 154(b) by 202 days.

(21) Appl. No.: 14/228,774

(22) Filed: Mar. 28, 2014

(65) Prior Publication Data
US 2015/0273589 A1    Oct. 1, 2015

(51) Int. Cl.
| | |
|---|---|
| B23B 27/10 | (2006.01) |
| B23Q 11/10 | (2006.01) |
| B23C 5/22 | (2006.01) |
| B23C 5/28 | (2006.01) |

(52) U.S. Cl.
CPC ............. *B23B 27/10* (2013.01); *B23C 5/2269* (2013.01); *B23C 5/28* (2013.01); *B23Q 11/10* (2013.01); *B23B 2250/12* (2013.01); *B23B 2260/146* (2013.01); *Y10T 407/14* (2015.01); *Y10T 407/2272* (2015.01)

(58) Field of Classification Search
CPC ............ Y10T 407/14; Y10T 407/2256; Y10T 407/2284; Y10T 407/1922; Y10T 407/1938; Y10T 407/2274; Y10T 407/2282; Y10T 407/225; Y10T 407/2286; B23B 2205/00; B23B 27/1625; B23B 27/1644; B23B 27/1666; B23C 5/22; B23C 5/2239; B23C 5/2265
USPC ........... 407/11, 94, 108, 41, 49, 103, 107, 91, 407/109
See application file for complete search history.

(56) References Cited

U.S. PATENT DOCUMENTS

| | | | |
|---|---|---|---|
| 4,621,547 A | 11/1986 | Yankoff | |
| 4,791,840 A * | 12/1988 | De Rosier | B23B 25/02 407/11 |
| 4,829,859 A | 5/1989 | Yankoff | |
| 4,848,198 A * | 7/1989 | Royal | B23B 25/02 407/11 |
| 5,718,156 A * | 2/1998 | Lagrolet | B23B 27/10 407/11 |
| 5,901,623 A | 5/1999 | Hong | |
| 2008/0124180 A1 | 5/2008 | Breish | |
| 2008/0131215 A1 | 6/2008 | Sjoo | |
| 2008/0175677 A1* | 7/2008 | Prichard | B23C 5/2273 407/11 |
| 2008/0240872 A1* | 10/2008 | Rimet | B23B 27/1685 407/51 |

(Continued)

FOREIGN PATENT DOCUMENTS

| | | | |
|---|---|---|---|
| JP | 07060507 A | * | 3/1995 |
| JP | 2001287103 A | * | 10/2001 |
| WO | 2012/171976 A1 | | 6/2012 |

*Primary Examiner* — Daniel Howell
*Assistant Examiner* — Nicole N Ramos
(74) *Attorney, Agent, or Firm* — Larry R. Meenan

(57) ABSTRACT

A wedge clamp includes a top wall, a bottom wall, a front wall, a rear wall opposite the front wall, and a fluid port traversing from the front wall to the rear wall. The fluid port has a front opening and a rear opening to allow cooling fluid to pass therethrough. In one embodiment, the front opening is a rounded isosceles trapezoid in shape with a pair of parallel substantially planar side walls of different length and a pair of arcuate side walls connecting the pair of planar side walls. The rear opening has a greater surface area proximate the rear wall and a smaller surface area proximate the front opening, resulting in a funnel-shaped opening to cause an increase in velocity of the cooling fluid passing through the fluid port.

19 Claims, 4 Drawing Sheets

(56) References Cited

U.S. PATENT DOCUMENTS

| | | | | |
|---|---|---|---|---|
| 2011/0020074 A1* | 1/2011 | Chen | ............... | B23B 27/10 407/11 |
| 2011/0305531 A1* | 12/2011 | Amstibovitsky | ........ | B23B 27/10 407/11 |
| 2011/0311323 A1* | 12/2011 | Hecht | ............... | B23B 27/1677 407/11 |
| 2013/0078043 A1* | 3/2013 | Henry | ............... | B23B 27/1622 407/11 |
| 2013/0294854 A1 | 11/2013 | Lee | | |

* cited by examiner

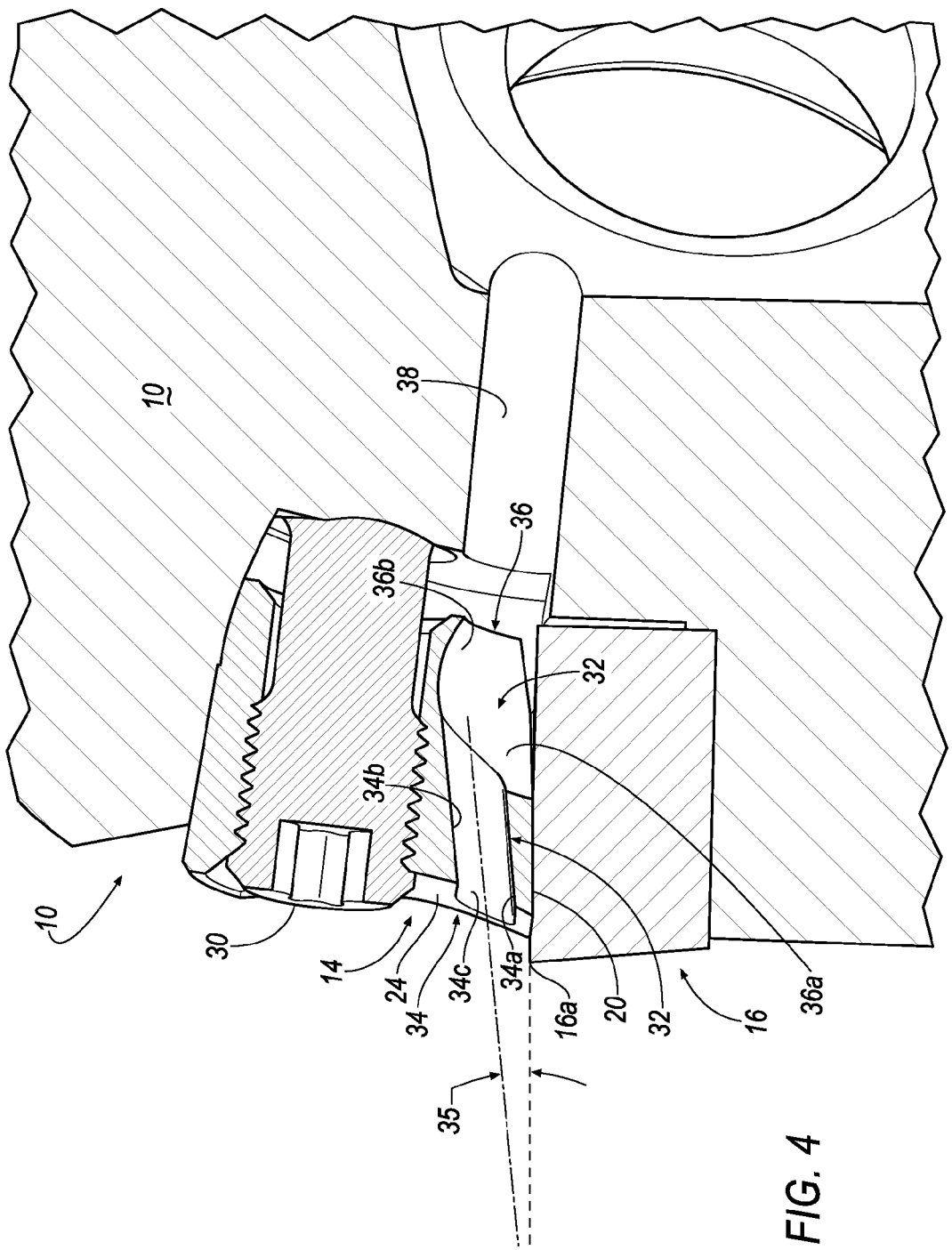

WEDGE CLAMP WITH FLUID PORT

BACKGROUND OF THE INVENTION

1. Field of the Invention

The invention pertains to the field of cutting tools. More particularly, the invention pertains to a wedge clamp for a cutting tool that directs cooling fluid, such as air, and the like, to the cutting edge of an insert mounted in the cutting tool.

2. Description of Related Art

In metal working, heat is generated at the point of movement. The heat is exacerbated with the use of ceramic cutting inserts when used on high temperature allow metals. When cutting under these conditions, a grinding-like spark is generated instead of a chip, which in turn, heats up the cutting edge of the insert. As a result, the cutting edge needs to be cooled with a fluid, such as compressed air, and the like, or premature wear will be incurred.

SUMMARY OF THE INVENTION

The problem of minimizing heat buildup on the cutting edge of an insert is solved by providing a wedge clamp with a fluid port to allow cooling fluid to pass therethrough.

In one aspect of the invention, a wedge clamp comprises a top wall, a bottom wall, a front wall, a rear wall opposite the front wall, and a fluid port traversing from the front wall to the rear wall, the fluid port having a front opening and a rear opening to allow cooling fluid to pass therethrough.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 4 is a cross-sectional view of the wedge clamp with the fluid port when mounted in the pocket of the cutting tool.

DETAILED DESCRIPTION OF THE INVENTION

Figure 1:
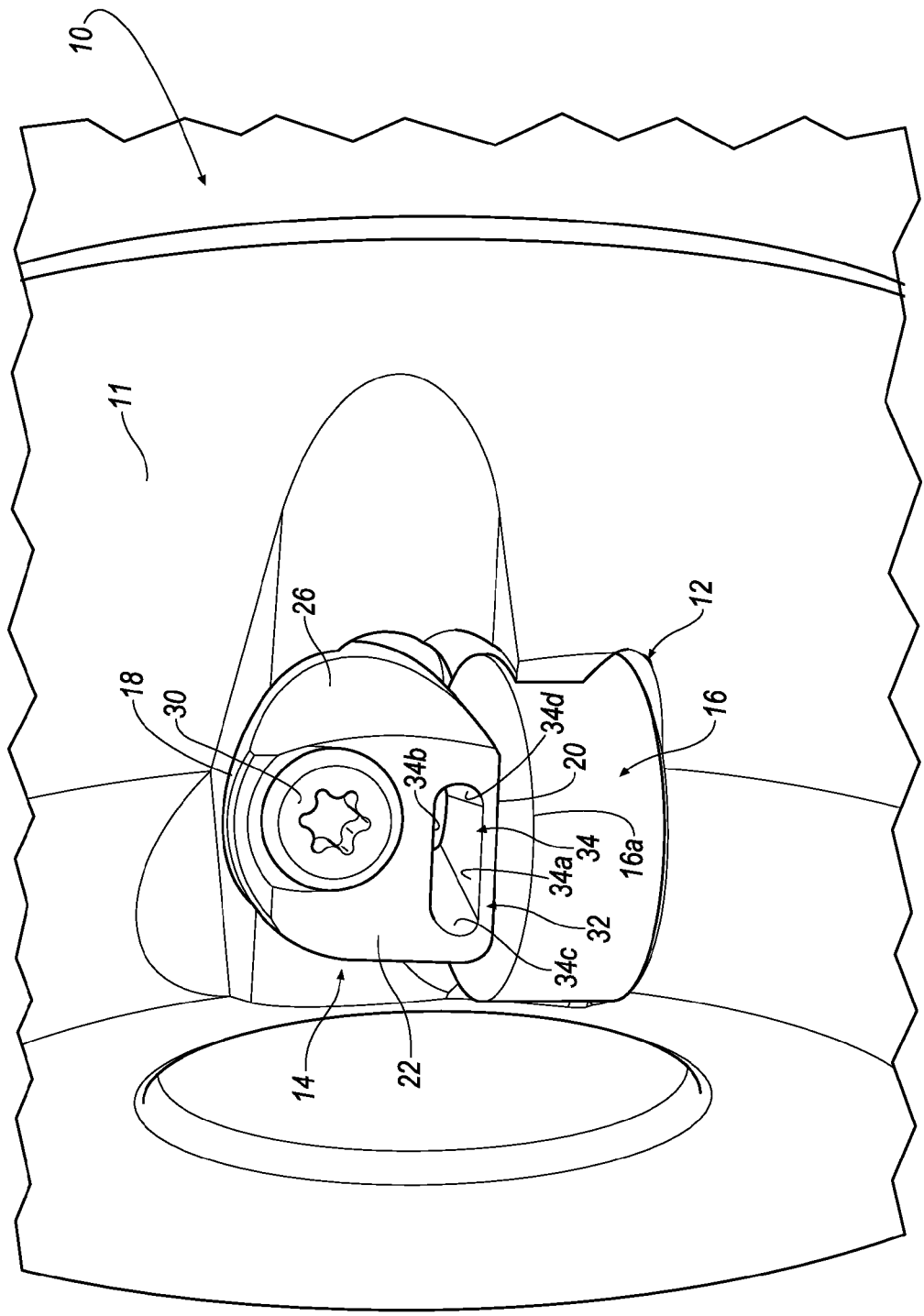
FIG. 1 is an isometric front view of a clamp wedge with a fluid port when mounted in a pocket of a cutting tool according to an embodiment of the invention.

Referring now to FIG. 1, a cutting tool 10, for example, a milling cutter, includes a body 11 with at least one pocket 12 and a wedge clamp, shown generally at 14, according to an embodiment of the invention. In the illustrated embodiment, only a single pocket 12 is shown for brevity. However, it will be appreciated that the cutting tool 10 may include any number of pockets 12, and that the invention is not limited by the number of pockets 12 shown in the illustrated embodiment. Each pocket 12 is capable of receiving a cutting insert 16 that is securely held in the pocket 12 by the wedge clamp 14 of the invention. In the illustrated embodiment, a round cutting insert 16 is shown. However, it will be appreciated that the invention is not limited by the shape of the cutting insert 16, and that the wedge clamp 14 of the invention can be used to secure any desirable shape of cutting insert 16 in the pocket 12.

Figure 2:
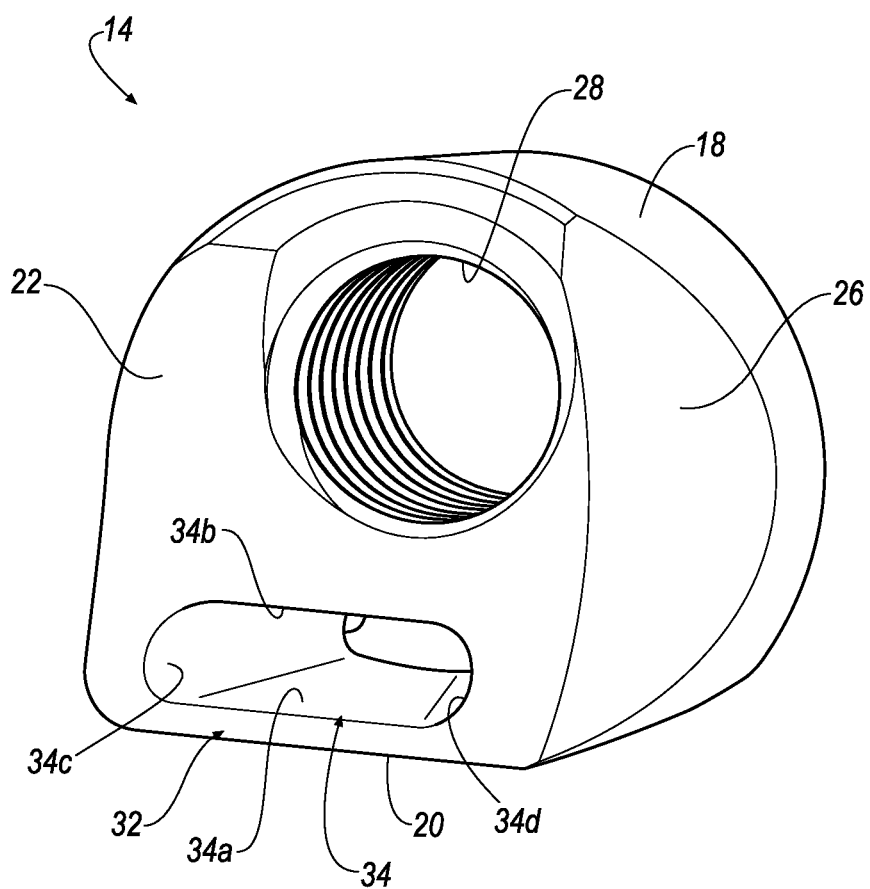
FIG. 2 is an isometric front view of the wedge clamp with the fluid port according to an embodiment of the invention.
Figure 3:
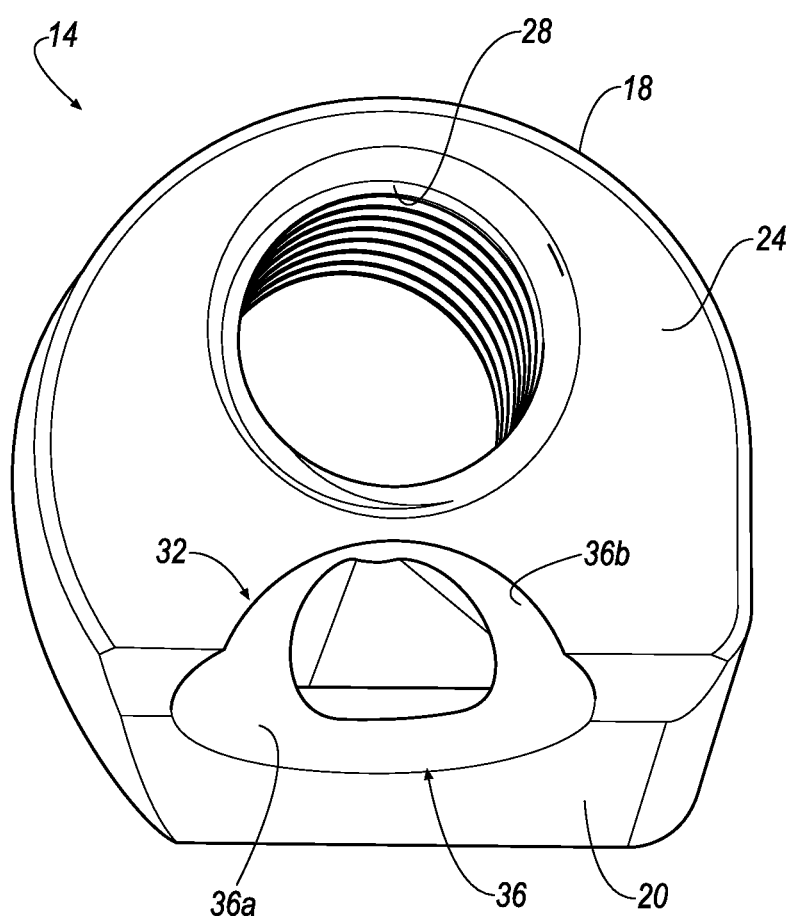
FIG. 3 is an isometric rear view of the wedge clamp with the fluid port according to an embodiment of the invention.

Referring now to FIGS. 2 and 3, the wedge clamp 14 is shown according to an embodiment of the invention. The wedge clamp 14 is generally circular in shape having an arcuate top wall 18, a substantially planar bottom wall 20, a front wall 22 and a rear wall 24 opposite the front wall 22. The front wall 22 may be arcuate in shape to provide a desirably shaped surface for the effective evacuation of chips. The front wall 22 may also include a facet surface 26 to further allow for the effective evacuation of chips. The rear wall 24 may be any desirable shape, such as planar, arcuate, and the like. The wedge clamp 14 also includes a threaded bore 28 to allow a threaded member 30 (FIGS. 1 and 4) to be threaded into the threaded bore 28 and into the body 11 of the cutting tool 10 to secure the cutting insert 16 in the pocket 12.

As shown in FIGS. 2-4, one aspect of the invention is that the wedge clamp 14 includes a fluid port, shown generally at 32, that traverses from the front wall 22 to the rear wall 24 of the wedge clamp 14 (i.e. entirely through the front wall 22 and rear wall 24) to allow cooling fluid, such as air, and the like, to pass therethrough. In the illustrated embodiment, the fluid port 32 has a front opening, shown generally at 34, having a general shape of a rounded isosceles trapezoid. In other words, the front opening 34 has a pair of parallel substantially planar side walls 34a, 34b of different width and depth and a pair of arcuate side walls 34c, 34d connecting the planar side walls 34a, 34b. Specifically, the side wall 34a that is closer to the bottom wall 20 has a greater width than the side wall 34b, as shown in FIG. 2, but a shorter depth than the side wall 34b, as shown in FIG. 4. It has been shown that the general rounded isosceles trapezoidal shape of the front opening 34 disperses the cooling fluid, such as air, and the like, across a wider surface area of the cutting insert 16 than front opening with a different shape. However, it will be appreciated that the invention is not limited by the particular shape of the front opening 34, and that the invention can be practiced with any desirable shape that provides a sufficient amount of cooling fluid to pass across the cutting insert 16. As seen in FIG. 4, the fluid port 32 is formed at a downward angle 35 with respect the bottom wall 20 of the wedge clamp 14. In one embodiment, the downward angle 35 is in a range between about five (5) degrees and about fifteen (15) degrees. The downward angle 35 allows the fluid port 32 to direct the cooling fluid toward the cutting edge 16a of the cutting insert 16.

As shown in FIGS. 3 and 4, the fluid port 32 also has a rear opening 36 having a first wall portion 36a formed in the bottom wall 20 of the wedge clamp 14 and a second wall portion 36b formed in the rear wall 24 of the wedge clamp 14. The first and second wall portions 36a, 36b are generally arcuate in shape, resulting in the rear opening 36 having a greater surface area proximate the rear wall 24 and a smaller surface area proximate the front opening 34, as shown in FIG. 3. This difference in the surface areas results in the rear opening 36 to have a general funnel-like shape to cause the cooling fluid to increase in velocity as the fluid passes from a coolant port 38 (FIG. 4) in the body 11 of the cutting tool 10 through the rear opening 36 toward the front opening 34 of the fluid port 32. It should be appreciated that the rear opening 36 can be entirely formed in the rear wall 24 of the wedge clamp 14, thereby eliminating the first wall portion 34a formed in the bottom wall 20, if desired. In addition, a seal (not shown) can be provided between the rear opening 36 and the coolant port 38 to prevent leakage of the cooling fluid therebetween.

There are many variations of the fluid port 32 shown in the illustrated embodiment. For example, the fluid port 32 may include a mesh or screen (not shown) to allow the cooling fluid to pass therethrough, but prevent any debris, such as chips, and the like, to enter the fluid port 32 and possibly prevent sufficient flow of the cooling fluid therethrough.

The patents and publications referred to herein are hereby incorporated by reference.

Having described presently preferred embodiments the invention may be otherwise embodied within the scope of the appended claims.

What is claimed is:

1. A wedge clamp comprising:
    a top wall;
    a bottom wall;
    a front wall;
    a rear wall opposite the front wall; and
    a fluid port traversing from the front wall to the rear wall, the fluid port having a front opening and a rear opening to allow cooling fluid to pass therethrough,
    wherein the front opening has a pair of parallel substantially planar side walls of different length and a pair of arcuate side walls connecting the pair of planar side walls.

2. The wedge clamp according to claim 1, wherein the front opening is a rounded isosceles trapezoid in shape.

3. The wedge clamp according to claim 1, wherein one of the pair of side walls that is closer to the bottom wall has a greater width and a shorter depth than the other one of the pair of side walls.

4. A wedge clamp comprising:
    a top wall;
    a bottom wall;
    a front wall;
    a rear wall opposite the front wall; and
    a fluid port traversing from the front wall to the rear wall, the fluid port having a front opening and a rear opening to allow cooling fluid to pass therethrough,
    wherein the rear opening has a first wall portion formed in the bottom wall of the wedge clamp and a second wall portion formed in the rear wall of the wedge clamp, and
    wherein the first wall portion and the second wall portion are arcuate in shape.

5. The wedge clamp according to claim 1, wherein the rear opening has a greater surface area proximate the rear wall and a smaller surface area proximate the front opening.

6. The wedge clamp according to claim 1, wherein the fluid port is formed at a downward angle with respect the bottom wall.

7. The wedge clamp according to claim 4, wherein the front opening is a rounded isosceles trapezoid in shape.

8. The wedge clamp according to claim 4, wherein the front opening has a pair of parallel substantially planar side walls of different length and a pair of arcuate side walls connecting the pair of planar side walls.

9. The wedge clamp according to claim 8, wherein one of the pair of side walls that is closer to the bottom wall has a greater width and a shorter depth than the other one of the pair of side walls.

10. The wedge clamp according to claim 4, wherein the rear opening has a greater surface area proximate the rear wall and a smaller surface area proximate the front opening.

11. The wedge clamp according to claim 4, wherein the fluid port is formed at a downward angle with respect the bottom wall.

12. A wedge clamp for securing a cutting insert in a pocket of a cutting tool, the wedge clamp comprising:
    a top wall;
    a bottom wall;
    a front wall;
    a rear wall opposite the front wall;
    a fluid port traversing from the front wall to the rear wall, the fluid port having a front opening and a rear opening to allow cooling fluid to pass therethrough; and
    a threaded bore extending from the front wall to the rear wall for allowing a threaded member to be threaded into a cutting tool to secure a cutting insert in a pocket of a cutting tool.

13. The wedge clamp according to claim 12, wherein the front opening is a rounded isosceles trapezoid in shape.

14. The wedge clamp according to claim 12, wherein the front opening has a pair of parallel substantially planar side walls of different length and a pair of arcuate side walls connecting the pair of planar side walls.

15. The wedge clamp according to claim 14, wherein one of the pair of side walls that is closer to the bottom wall has a greater width and a shorter depth than the other one of the pair of side walls.

16. The wedge clamp according to claim 12, wherein the rear opening has a first wall portion formed in the bottom wall of the wedge clamp and a second wall portion formed in the rear wall of the wedge clamp.

17. The wedge clamp according to claim 16, wherein the first wall portion and the second wall portion are arcuate in shape.

18. The wedge clamp according to claim 12, wherein the rear opening has a greater surface area proximate the rear wall and a smaller surface area proximate the front opening.

19. The wedge clamp according to claim 12, wherein the fluid port is formed at a downward angle with respect the bottom wall.

* * * * *